April 16, 1963 R. DE FILIPPIS 3,085,772
LANDING OF AIRCRAFT AND TAKE-OFF
Filed Oct. 5, 1959 3 Sheets-Sheet 1

RAYMOND DE FILIPPIS
INVENTOR.

BY
ATTORNEY

April 16, 1963  R. DE FILIPPIS  3,085,772
LANDING OF AIRCRAFT AND TAKE-OFF
Filed Oct. 5, 1959  3 Sheets-Sheet 2
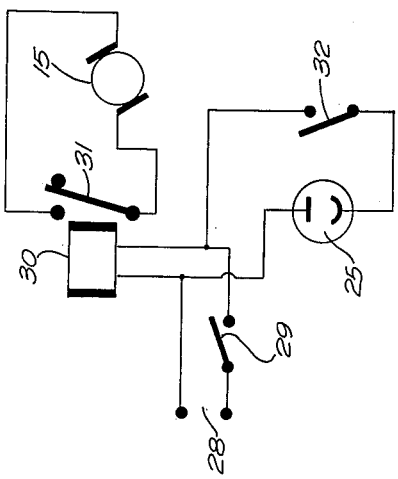
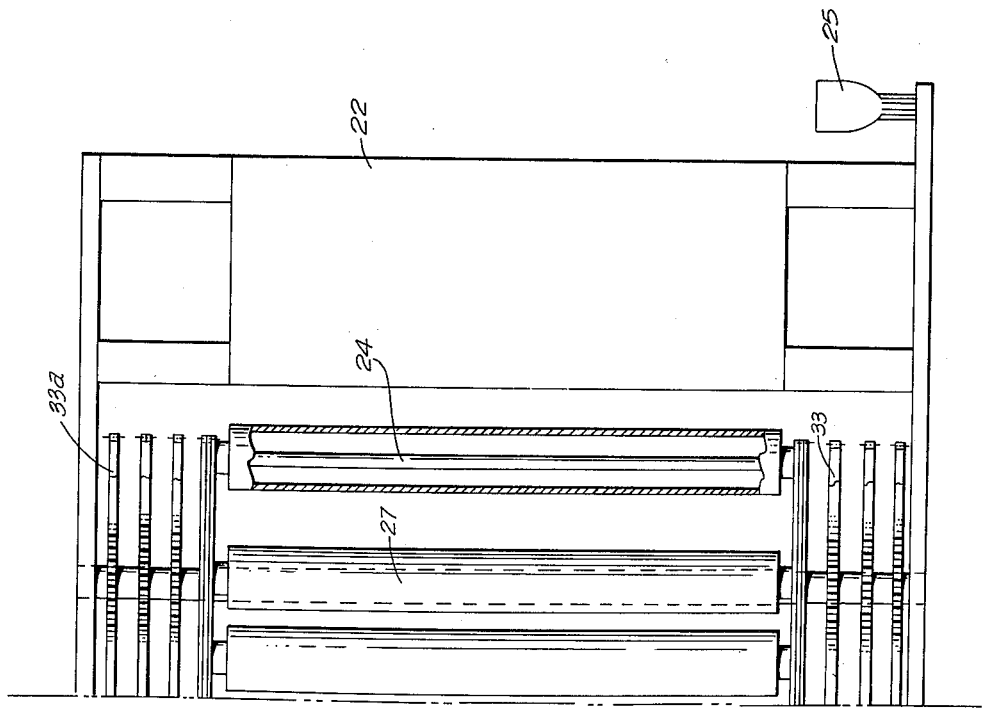
RAYMOND DE FILIPPIS
INVENTOR.
ATTORNEY April 16, 1963   R. DE FILIPPIS   3,085,772
LANDING OF AIRCRAFT AND TAKE-OFF
Filed Oct. 5, 1959   3 Sheets-Sheet 3

RAYMOND DE FILIPPIS
INVENTOR

United States Patent Office 3,085,772
Patented Apr. 16, 1963

3,085,772
LANDING OF AIRCRAFT AND TAKE-OFF
Raymond De Filippis, 99—63 66th Ave.,
Rego Park 74, N.Y.
Filed Oct. 5, 1959, Ser. No. 844,597
8 Claims. (Cl. 244—114)

This invention relates to the landing of aircraft such as jet planes and etc., with positive control, and complete safety, a roller system is provided therefore, so that incoming aeroplanes, may land on same, at any relative speed between the roller system and aeroplane, to execute the proper landing, without jarring, to the plane, or its struts, or application of plane brakes, since the impetus of the plane is thoroughly spent, automatically or manually.

Another object of the invention is to provide a system and apparatus, which may be used with equal facility for the take-off and landing of airplanes.

A feature of the invention is that a turn-table is provided for supporting the roller mechanism, which enables the entire roller mechanism to be rotated into a position aligned with prevailing winds to enable a plane to either take off from or land on the roller mechanism.

The roller mechanism supports the airplane until the engines are opened to relatively full throttle, after which the rollers facilitate take-off in the required direction relative to the wind, or into the wind.

The apparatus can be mounted on ships such as aircraft carriers, in which adequate space is available to support the apparatus, with adequate auxiliary deck area, to allow the roller mechanism to be rotated by means of the turn-table.

The apparatus may also be used on small airports, where a large enough area is available to support the apparatus and to allow the roller mechanism to be maneuvered by means of the turn-table, and also to allow space for control facilities to operate the roller mechanism controls.

Another feature of the invention is that it improves the safety characteristics of the aircraft in landing, as the aircraft may land at high speed, the rollers serving to arrest the rotation of the wheels to assist in landing.

In order to absorb the loads imposed on the apparatus, it is essential that it be mounted on the deck of an aircraft carrier or similar vessel, or directly on the ground at an airport or other landing strip.

Another feature is that in specific installations, the turn-table may be omitted, the roller mechanism being used independently.

In transmitting the drive from the motor to the roller drive mechanism, a variable speed transmission in combination with a reversing mechanism may be provided, to facilitate control of the speed and direction of movement of the chains and the rollers for either take-off or landing of an airplane.

In some instances where the aircraft is very fast as to outrun the speed of the rollers, a landing can first be accomplished on the ground, in direct line relation with the roller system, and when it enters the roller system, the operator can slow the plane down to the speed for a proper stop, and thereby control it as though it had landed on the roller system itself.

Another object of the invention is to provide a live take-off roller system as shown whereby the impetus of the vehicle is increased to a point where the aircraft will take-off with ease, on the rollers or off the rollers as the most desirable, in relation with load, and vehicle, type, and design.

Another object of the invention is that the power unit can be controlled by the tower operator-when so desired and for example when weather is bad, the speed of the plane and the speed of the rollers may be controlled by cooperation of the tower and the pilot.

Another object of the invention is that regardless of when the craft strikes, or rides, on the roller system, before landing, or after landing, the craft is slowed down to a controllable speed, even though the speed, of the craft may have been miscalculated, by the pilot or the operator of the roller system.

The landing of aircraft having been fully described in the above paragraphs I wish to describe a possible condition of take-off, not necessarily limited to this description.

In order to function properly, it is essential that the pilot of the aircraft and the operator controlling the roller mechanism co-ordinate properly.

During take-off the chains supporting the rollers are initially operated in a direction opposite the direction of movement of the airplane, so that even with the engine operating at fairly high speed, the airplane would be substantially stationary, as the wheels would be moved rearward.

When the engine reaches take-off speed, and the pilot is ready to take off, the propeller is adjusted for take-off, the chains supporting the rollers are slowed down, and may even be reversed to a direction co-ordinated with the direction of rotation of the wheels at take-off.

This enables the wheels of the airplane to move forward relative to the roller mechanism, and if the chains supporting the rollers are moving in a forwardly direction, the rollers actually assist in moving the airplane off the roller mechanism.

This allows the airplane to leave the roller support mechanism, at flying speed and where the rollers are moved in a direction corresponding to the wheel direction, the rollers tend to actually accelerate the airplane at take-off, and function in substantially the same manner as a catapult.

A further example of the landing is provided herein is that if an aircraft is coming in at 150 miles per hour the roller speed should be at 120 miles per hour, then the craft would slow down to 30 m.p.h. after striking the roller system.

A further object is to make clear that a plane is brought to a stop, by stages of roller system operation, without injury or stress to aeroplane, or its passengers, even though the first contact with the rollers by the plane may be at high speeds.

The turn-table attachment is not an absolute necessity to this invention, as the system of roller system and plane co-ordination is all that is necessary to make safe and easy landings in a small space, as well as take-offs of planes, the turn-table is merely an adjunct to better and easier performance of plane and rollers.

A variable speed device with any well-known power source, of a standard make, will suffice.

Another object of the invention is to have the plane enter the roller action, so that the speed impetus of the plane is controlled, automatically and/or manually, by virtue of electric-eye, ground contact, and finally at the control tower by an operator.

Another object of the invention is to relieve the stress encountered to planes on take-off, by giving an impetus to the plane by virtue of roller action on wheels or even skids in place of wheels, if necessary, under certain conditions.

A further object is that this system can also be used by a plane manufacturer as a test stand.

In the drawings:

FIGURES 1a and 1b represent a plan view of the roller mechanism, including the roller driving mechanism, and the turn-table supporting the roller mechanism.

FIGURE 2 is a schematic wiring diagram of the circuit representing the control mechanism of the roller mechanism.

Figure 1A:
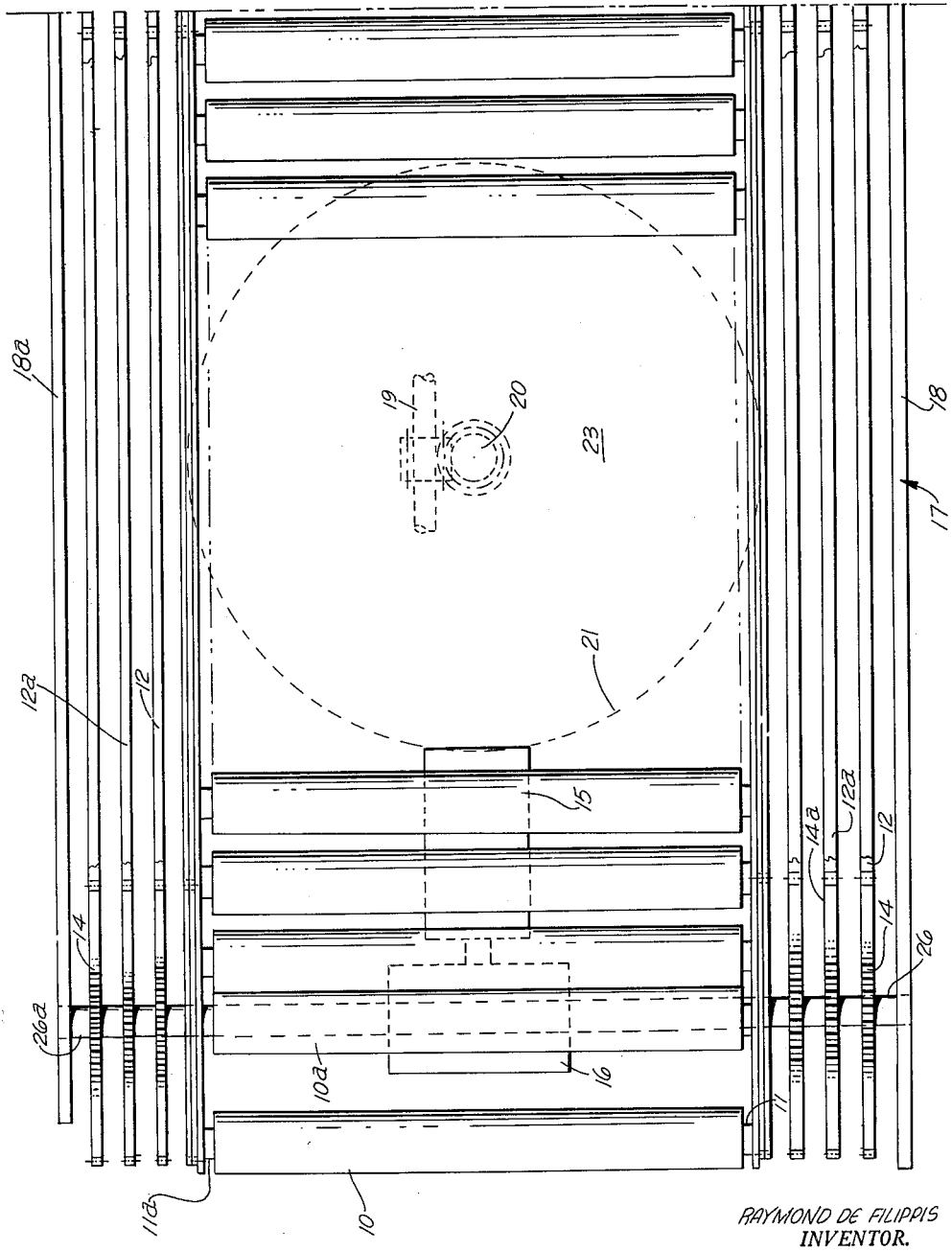
Figure 3:
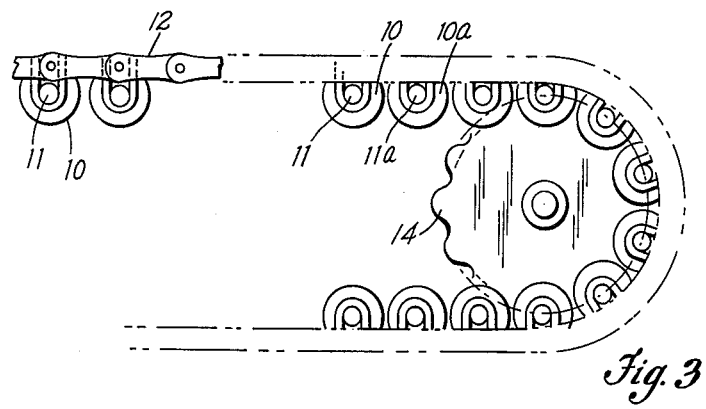
FIGURE 3 is a side elevational view of the chain drive mechanism and the rollers shown in FIGS. 1a and 1b.
Figure 4:
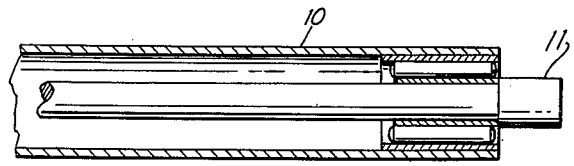
FIG. 4 is a longitudinal section through one of the rollers shown in FIGS. 1a and 1b and the shafts supporting the rollers.

The roller mechanism shown in FIGURES 1 and 1a, includes a plurality of rollers 10, 10a, each of which is supported by a pair of stub shafts 11, 11a integral with the plugs at the ends of each of the rollers.

Each of the rollers is driven by a plurality of chains 12, 12a, mounted at both ends of the rollers, each of the chains being driven by a plurality of sprockets 14, 14a. Each of the tubular rollers 10, 10a has a pair of plugs fitted to the ends thereof, the plugs supporting the stub shafts 11, 11a.

The drive sprockets 14, 14a, are driven by a motor 15, which drives a variable speed reduction gear drive mechanism 16, which in turn drives a pair of shafts 26, 26a, which connect and support the two sprockets 14, 14a. The shafts 26, 26a are rotatably supported by the side walls 18, 18a of the bracket. A second shaft 27 rotatably supports the two groups of sprockets 33, 33a which are located at the opposite end of the chains 12, 12a. The second shaft 27, which is substantially parallel to the shafts 26, 26a, is also rotatably supported by the side walls 18, 18a of the bracket.

The reduction gear mechanism includes a reverse gear mechanism, which enables the roller drive mechanism to be reversed, thereby facilitating reversing the reduction gear drive and the direction of movement of the rollers.

The entire roller drive mechanism is supported by a bracket 17, including a pair of side walls 18, 18a, the flat-base 23 of the bracket being supported by the rotatable turn-table 21, on which the roller mechanism is mounted, the turn-table being supported by a central shaft 20, which is rotatably controlled by a control shaft 19. The flat base 23 of the bracket 17 is integral with the side walls 18, 18a of the bracket and substantially perpendicular thereto.

At the forward end of the roller mechanism shown in FIGURE 1b, a ramp 22 supported by the side walls 18, 18a of the bracket 17 is mounted, the ramp enabling the wheels of an airplane to reach the ground from the rollers 10, 10a, or climb up on the rollers from the ground.

A heating element 24, is provided at the center of each of the rollers 10, 10a, to facilitate heating the individual rollers.

In order to facilitate automatic control of the roller drive mechanism shown in FIGURES 1 and 1a, a photo-cell 25 is provided at the forward end of the rollers 10, 10a, the photo-cell being supported by one of the side walls 18, 18a of the bracket 17.

As hereinbefore described, the turn-table 21, shown in FIGURES 1a and 1b may be eliminated, the roller support bracket being mounted directly on the ground, or on the deck of an aircraft carrier.

FIGURE 2 shows a schematic wiring diagram of the circuit used to control the roller drive.

In this circuit, the current flows from a source 28, through a switch 29, to a relay 30, the relay having one or more contacts 31 incorporated therewith, the contacts 31 of the relay being adapted to control the flow of current to the motor 15, which in turn drives the reduction gear mechanism 16.

In the photo-cell controlled circuit shown in FIGURE 2, a photo-cell 25 is connected to the voltage source 28, a separate switch 32 being provided to energize the photo-cell controlled circuit. The photo-cell is directly connected to the relay 30, thereby energizing the relay 30 and the contacts 31 thereof, thereby controlling the operation of the motor 15, in substantially the same manner as the operation by means of the control switch 29.

The operation of the apparatus is substantially as follows:

Prior to take off, the airplane is moved onto the rollers of the roller mechanism, either under its own power, or towed by a tractor, or by other towing means.

When the engine of the airplane is started, the rollers are moved in a direction opposite the direction of rotation of the wheels of the aircraft at take-off, thereby to reverse the direction of rotation of the wheels of the airplane. As the engine speed of the aircraft is increased, the reverse speed of the rollers is increased, thereby increasing the retarding force against the wheels of the aircraft.

When the plane is ready to take off, the direction of movement of the rollers 10, 10a is reversed by means of the reverse gear incorporated with the reduction gear mechanism 16.

The speed of the rollers is increased until they reach a speed corresponding with the normal take-off speed of the airplane, thus facilitating take-off of the airplane until it finally leaves the roller mechanism and takes off into the air.

Prior to landing, the rollers are moved in a direction reversed from that of the normal direction of rotation of the wheels during landing.

The speed of movement of the rollers is co-ordinated with the normal landing speed of the aircraft, so that the roller movement speed is somewhat lower than the speed of the wheels, if they were to strike a runway or the ground.

Thus the rollers serve as an arresting mechanism to arrest the speed of the airplane during landing. After the airplane has either landed on the ground ahead of the roller mechanism and been run up on the roller mechanism, by means of ramp 22 shown in FIGURE 1b, which may be located at either or both ends of the roller mechanism, the speed of movement of the rollers 10, 10a is progressively reduced, by reducing the speed of the motor 15, or by shifting the reduction gear 16 to a lower speed, the speed being reduced while the engine speed of the airplane is cut off, so that when the airplane comes to rest, the rollers are also stopped, thereby retaining the airplane in a stationary position.

In this position the airplane is ready for take off.

Prior to take off or landing, the entire roller mechanism is rotated by means of the shaft of the turn-table until the rollers are located in a direction directly aligned with the prevailing winds in order to enable the airplane to take off or land into the wind.

For carrier use, the turn-table may be eliminated, the roller mechanism being supported directly on the deck of the vessel by means of the bracket 17. For this type of operation, the vessel is maneuvered until the axis of the vessel is aligned with the direction of the prevailing winds.

The photocell 25 shown in FIGURE 1b, may be mounted at one end of the roller mechanism, near the ramp 22, as shown in FIGURE 1b, or individual photo-cells may be mounted at both ends of the roller mechanism In this position, the photo-cell 22 is able to pick up an airplane approaching the ramp 22, thereby energizing the roller control mechanism in the manner hereinbefore described.

In order to facilitate utilization of the same roller mechanism for both take-off and landing, ramps, such as that shown in FIGURE 1b, may be mounted at both ends of the roller mechanism. At the same time a photo-cell 25 or photo-cells may be mounted at the opposite end of the roller mechanism adjacent the second ramp.

This enables the same roller mechanism to be utilized with a minimum of rotation of the turn-table regardless of the wind direction.

For take-off, the photo-cell or cells may be utilized to pick up the airplane as it approaches the roller mechanism, of means of the ramp 22, in order to start the rotation of the rollers, or it may be mounted at the opposite end to shut off the rotation of the rollers after the airplane has left the roller mechanism.

The switches and speed control mechanism shown in FIGURE 2, may be controlled by an operator located at the roller mechanism or the switches and control mechanism may be controlled by the control tower of the field or the carrier, the operator simultaneously signaling the pilot in order to co-ordinate the speed of the airplane, and the rate of rotation and speed of the rollers 10, 10a.

The ramp 22 may be utilized as a means for allowing the airplane to approach the roller mechanism, and it may also be utilized to control the roller control switches, the ramp being adapted to engage the switch or switches, when the ramp is depressed by an approaching airplane.

In order to keep the rollers free of snow and ice at all times, individual heating elements 24, may be mounted inside each of the rollers 10, 10a, as shown in FIGURES 1a, 1b, the current for the heating elements being supplied from the same source 28, as that shown in FIGURE 2, for energizing the motor 15.

A bus bar may be mounted adjacent one end of the roller shafts, brushes or other types of contacts being provided on each roller shaft at one end of the roller, to transmit the voltage from the bus bar to the heating element 24 mounted inside each roller.

I claim:

1. A combination landing and take-off device for aircraft, comprising a plurality of substantially cylindrical rollers located substantially parallel to one another, a pair of stub shafts attached to the ends of each of said rollers, co-axially therewith, said stub shafts projecting beyond the ends of each of said rollers, a plurality of chains mounted adjacent each end of said rollers, a plurality of sprockets located adjacent the forward and rear rollers, the rotation of one group of said sprockets being adapted to drive the chains, means attached to one of said chains at each end of said rollers, adapted to individually rotatably support the stub shafts of said rollers, the chains being adapted to move the rollers in a direction substantially perpendicular to the longitudinal axis of the rollers, co-ordinated with the movement of the chains, under a control of the sprockets, the individual rollers being rotatable about the stub shafts thereof, means adapted to rotatably drive the drive group of said sprockets, means adapted to vary the speed of rotation of said drive sprockets, means adapted to reverse the direction of rotation of the chain drive sprockets, and means adapted to electrically control and energize the sprocket drive means.

2. A combination landing and take-off device for aircraft, comprising a plurality of substantially cylindrical rollers, located substantially parallel to one another, a pair of stub shafts attached to the ends of each of said rollers, co-axially therewith, said stub shafts projecting beyond the ends of each of said rollers, a plurality of co-ordinated chains mounted adjacent each end of said rollers, a plurality of sprockets located adjacent the forward and rear rollers, a plurality of shafts rotatably supporting the groups of sprockets adjacent each end of the roller mechanism, one group of sprockets being adapted to drive the chains, means attached to one of said chains on each end of said rollers, adapted to individually rotatably support the stub shafts of said rollers, the chains being adapted to move the rollers in a direction substantially perpendicular to the longitudinal axis of the rollers, co-ordinated with the movement of the chains, as driven by the sprockets, the individual rollers being rotatable about the stub shafts thereof, means adapted to rotatably drive the shafts supporting the drive sprockets near one end of said chains, means adapted to vary the speed of rotation of said drive sprockets, and means adapted to reverse the direction of rotation of the chain drive sprockets, a bracket having a pair of side walls mounted adjacent the chains supporting the rollers, each of said bracket side walls having means formed thereon adapted to support one end of each sprocket support shaft, and means adapted to electrically control and energize the drive sprocket drive means.

3. A combination landing and take-off device for aircraft, as in claim 2, in which the means adapted to drive the shafts supporting the drive sprockets, is an electrically energized motor, the means adapted to vary the speed of rotation of the drive sprockets being a variable speed reduction gear mechanism driven by said motor, the reduction gear mechanism having a reverse mechanism incorporated therewith, the electrical control mechanism including a photocell supported by one of the side walls of the bracket, a relay adapted to control the flow of current to the motor, and switching means controlled by the photo-cell adapted to control the operation of the relay.

4. A combination landing and take-off device for aircraft, as in claim 3, in which each of the rollers is substantially tubular, a pair of plugs fitted to the ends of each of the rollers, an electrically energized heating element fitted to the interior of each of said rollers, and switching means adapted to control the flow of current to said heating elements.

5. A combination landing and take-off device for aircraft, comprising a plurality of substantially cylindrical rollers, located substantially parallel to one another, a pair of stub shafts attached to the end of each of said rollers, co-axially therewith, said stub shafts projecting beyond the ends of each of said rollers, a plurality of co-ordinated chains mounted adjacent each end of said rollers, a plurality of sprockets located adjacent the forward and rear rollers, a plurality of shafts rotatably supporting the group of sprockets adjacent each end of the chains, one group of sprockets being adapted to drive the chains, means attached to one of said chains on each end of said rollers, adapted to individually rotatably support the stub shafts of said rollers, the chains being adapted to move the rollers in a direction substantially perpendicular to the longitudinal axis of the rollers, co-ordinated with the movement of the chains, as driven by the sprockets, the individual rollers being rotatable about the stub shafts thereof, an electrically controlled motor adapted to rotatably drive the shafts supporting the drive sprockets, near one end of said chains, a variable speed reduction gear mechanism driven by said motor, said reduction gear mechanism being directly coupled to the shafts supporting the drive sprockets, said reduction gear mechanism having a reversing gear incorporated therewith, a bracket having a pair of side walls mounted adjacent the chains, supporting the rollers, each of said bracket side walls having means formed thereon adapted to support one end of each of the sprocket support shafts, and means adapted to electrically control and energize the motor driving the group of drive sprockets, the bracket having a flat base integral therewith, the base being substantially parallel to the axes of the rollers, a rotatable turntable supporting the base of the bracket, a shaft rotatably supporting the turntable, and means adapted to rotatably drive the turntable shaft, the electrical control mechanism for controlling the motor including a relay adapted to control the flow of current to the motor, and manually controlled switching means adapted to control the operation of the relay.

6. A combination landing and take-off device for aircraft, comprising a plurality of substantially cylindrical rollers, located substantially parallel to one another, a pair of stub shafts attached to the ends of each of said rollers, co-axially therewith, said stub shafts projecting beyond the ends of each of said rollers, a plurality of co-ordinated chains mounted adjacent each end of said rollers, a plurality of sprockets located adjacent the forward and rear rollers, a plurality of shafts rotatably supporting the groups of sprockets adjacent each end of the roller mechanism, one group of sprockets being adapted to drive the chains, means attached to one of said chains on each end of said rollers, adapted to individually rotatably support the stub shafts of said rollers, means adapted to rotatably drive the shafts supporting the drive sprockets near one end of said chains, means adapted to vary the speed of rotation of said drive sprockets, and means adapted to reverse the direction of rotation of the chain drive sprockets, a bracket having a pair of side walls mounted adjacent the chains supporting the rollers, each of said bracket side walls having means formed thereon adapted to support one end of each sprocket support shaft, and means adapted to electrically control and energize the drive sprocket drive means, the means adapted to drive the shafts supporting the drive sprockets, being an electrically energized motor, the means adapted to vary the speed of rotation of the drive sprockets being a variable speed reduction gear mechanism driven by said motor, the reduction gear mechanism having a reverse mechanism incorporated therewith, a ramp mounted at one end of said device, said ramp being substantially parallel to the end rollers, said ramp being supported by the side walls of the bracket, each of the rollers being substantially tubular, a pair of plugs fitted to the ends of each of the rollers, an electrically energized heating element fitted to the interior of each of said rollers, and switching means adapted to control the flow of current to said heating elements.

7. A combination landing and take-off device for aircraft, comprising a plurality of substantially cylindrical rollers, located substantially parallel to one another, a pair of stub shafts attached to the ends of each of said rollers, co-axially therewith, said stub shafts projecting beyond the ends of each of said rollers, a plurality of co-ordinated chains mounted adjacent each end of said rollers, a plurality of sprockets located adjacent the forward and rear rollers, a plurality of shafts rotatably supporting the group of sprockets adjacent each end of the chains, one group of sprockets being adapted to drive the chains, means attached to one of said chains on each end of said rollers, adapted to individually rotatably support the stub shafts of each rollers, an electrically controlled motor adapted to rotatably drive the shafts supporting the drive sprockets, near one end of said chains, a variable speed reduction gear mechanism driven by said motor, said reduction gear mechanism being directly coupled to the shafts supporting the drive sprockets, said reduction gear mechanism having a reversing gear incorporated therewith, a bracket having a pair of side walls mounted adjacent the chains, supporting the rollers, each of said bracket side walls having means formed thereon adapted to support one end of each of the sprocket support shafts, and means adapted to electrically control and energize the motor driving the group of drive sprockets, the electrical control mechanism including a photo-cell supported by one of the side walls of the bracket, a relay adapted to control the flow of current to the motor, and switching means controlled by the photo-cell adapted to control the operation of the relay, a ramp mounted at one end of said device, said ramp being substantially parallel to the end rollers, said ramp being supported by the side wall of the bracket.

8. A combination landing and take-off device for aircraft, comprising a plurality of substantially cylindrical rollers, located substantially parallel to one another, a pair of stub shafts attached to the end of each of said rollers, co-axially therewith, said stub shafts projecting beyond the ends of each of said rollers, a plurality of co-ordinated chains mounted adjacent each end of said rollers, a plurality of shafts rotatably supporting the group of sprockets adjacent each end of the chains, one group of sprockets being adapted to drive the chains, means attached to one of said chains on each end of said rollers, adapted to individually rotatably support the stub shafts of said rollers, an electrically controlled motor adapted to rotatably drive the shafts supporting the drive sprockets, near one end of said chains, a variable speed reduction gear mechanism driven by said motor, said reduction gear mechanism being directly coupled to the shafts supporting the drive sprockets, said reduction gear mechanism having a reversing gear incorporated therewith, a bracket having a pair of side walls mounted adjacent the chains, supporting the rollers, each of said bracket side walls having means formed thereon adapted to support one end of each of the sprocket support shafts, and means adapted to electrically control and energize the motor driving the group of drive sprockets, a ramp mounted at one end of said device, said ramp being substantially parallel to the end rollers, said ramp being supported by the side walls of the bracket, each of the rollers being substantially tubular, a pair of plugs fitted to the ends of each of the rollers, an electrically energized heating element fitted to the interior of each of said rollers, and switching means adapted to control the flow of current to the heating elements.

References Cited in the file of this patent

UNITED STATES PATENTS

| | | |
|---|---|---|
| Re. 15,758 | Gibbons | Feb. 12, 1924 |
| 1,291,668 | Burton | Jan. 14, 1919 |
| 1,345,335 | Wielgosz | June 29, 1920 |
| 1,349,136 | Lillard | Aug. 10, 1920 |
| 1,478,747 | Kinyoun | Dec. 25, 1923 |
| 1,645,494 | Ballard | Oct. 11, 1927 |
| 2,185,979 | Dumas | Jan. 2, 1940 |
| 2,449,611 | Lupton | Sept. 21, 1948 |
| 2,484,230 | Jones | Oct. 11, 1949 |
| 2,602,536 | Eggleston | July 8, 1952 |
| 2,783,957 | O'Neil | Mar. 5, 1957 |
| 2,954,946 | O'Neil et al. | Oct. 4, 1960 |
| 2,959,273 | Sykes | Nov. 8, 1960 |

FOREIGN PATENTS

| | | |
|---|---|---|
| 712,060 | France | July 13, 1931 |